(No Model.)
J. J. LOWDEN.
PROCESS OF AND APPARATUS FOR PURIFYING OIL.
No. 465,822. Patented Dec. 22, 1891.
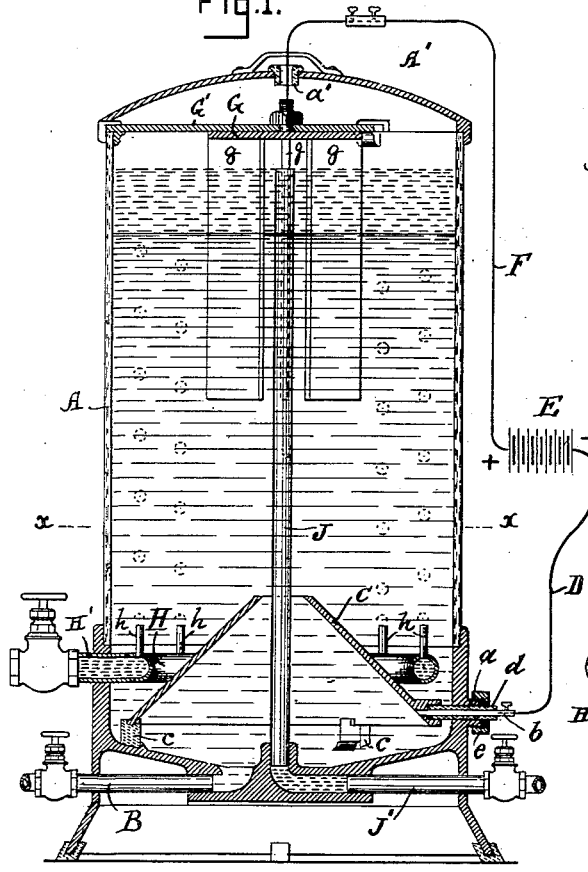
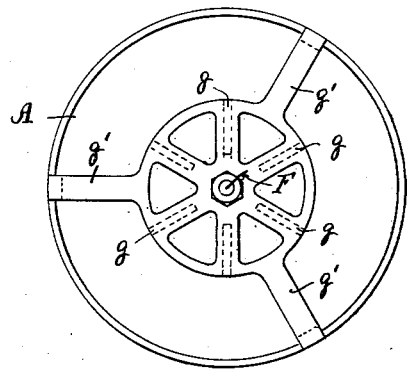
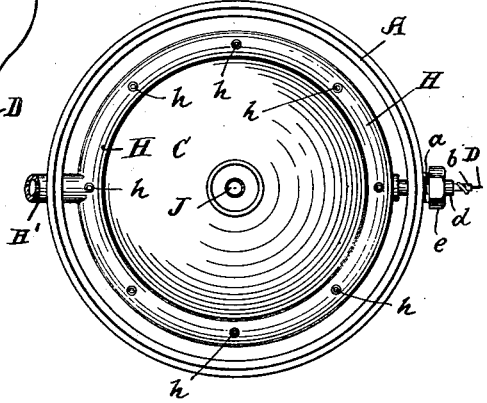
Witnesses.
Winifred G. Kerwin
John J. Moore
Inventor.
James J. Lowden
by Edwin Planta
Attorney

UNITED STATES PATENT OFFICE.

JAMES J. LOWDEN, OF EVERETT, ASSIGNOR OF ONE-HALF TO HENRY G. THOMAS, OF BOSTON, MASSACHUSETTS.

PROCESS OF AND APPARATUS FOR PURIFYING OIL.

SPECIFICATION forming part of Letters Patent No. 465,822, dated December 22, 1891.

Application filed April 20, 1891. Serial No. 389,543. (No model.)

*To all whom it may concern:*

Be it known that I, JAMES J. LOWDEN, a citizen of the United States, residing at Everett, in the county of Middlesex and State of Massachusetts, have invented a new and useful Improved Process and Apparatus for Purifying Oil, of which the following, taken in connection with the accompanying drawings, is a specification.

The object of my invention is to produce a process and apparatus for purifying oil containing metallic substances, especially oil that has been used for lubricating parts of dynamos or machinery used for electrical purposes, in which the particles of metal are magnetized or charged with electricity by means of an electric current.

The invention consists in causing the oil to be purified to pass in small drops through a body of water or other suitable fluid, through which an electric current is caused to pass, thus attracting and depositing all metallic particles that were contained in the oil, as hereinafter fully described and pointed out in the claims.

Referring to the accompanying drawings, Figure 1 represents a vertical section through an apparatus adapted to purify oil by an electric current according to my process. Fig. 2 is a plan or top view of the same, the cover being removed. Fig. 3 is a horizontal section taken on line *x x* of Fig. 1.

To purify oil according to my process, oil that has been used for lubricating dynamos or machinery used for electrical purposes and containing magnetized metallic particles is delivered in drops into a suitable vessel containing water or other suitable fluid, a magnetic current being caused to pass (preferably from the top to the bottom of the vessel) through the water, which current will attract all metallic particles contained in the drops of oil and cause them to be separated and fall to the bottom of the vessel.

In the drawings, A represents a cylindrical vessel of any suitable material. The bottom of the vessel is of conical form, and to the bottom of the same is attached a pipe B, through which can be drawn off the refuse matter that has been taken from the oil in the process of purifying.

C is a cone of suitable material supported upon the bottom of the vessel A by rests or blocks *c* of any suitable insulating material. To the cone C is secured a small metallic rod *b*, that passes out through a boss *a* on the side of the vessel A. This rod *b* is surrounded by a glass tube *d*, the end of which is cemented into the cone C. The boss *a* is screw-threaded to receive a cap *e*, so as to make a tight joint around the tube *d*. To the rod *b* is secured a wire D, that leads to the negative pole of a battery E, the positive pole of which is by wire F connected to a metallic plate G, having downwardly-projecting arms *g*. The plate G may be supported, as shown, by a plate G', having three arms *g'*, resting upon the upper edge of the vessel A.

A' is a cover for keeping dust or dirt out of the vessel A. The wire F where it passes through this cover may be coated with an insulating material or pass through an insulating-tube *a'*, as shown.

H is a pipe bent into a ring and connected to a pipe H', through which the oil to be purified is admitted. In the pipe H is arranged a series of teats or nipples *h*, through which the oil escapes into the vessel A.

J is a pipe that stands up in the center of the vessel A and down which the purified oil passes and is carried off by the pipe J'.

The operation is as follows: The vessel A is first filled with water or other suitable fluid to the desired height. The electric current is then caused to pass through the same, which current passes from the positive pole of the battery E to the plate G and arms *g*, thence through the water or other fluid to the cone C, and by the bar *b* and through wire D to the negative pole of the battery E. The oil containing magnetized metallic particles to be purified is now admitted to the pipe H and passes through the teats or nipples *h* and is delivered into the water in small drops. Magnetic attraction is now caused to act upon each drop as it passes up through the water, so that any particles of metal will be attracted, drawn out of the oil, and carried to the bottom of the vessel A, where they will remain until the vessel A is washed out, when they will be carried off by the pipe B. The drops of oil thus purified rise to the surface of the water and accumulate in a body, and then flow off through the pipe J.

Instead of a battery for producing the current, the wires may be connected to any electric circuit; or a dynamo-machine may be employed, if desired.

I prefer to construct the vessel A as shown—that is, with a metallic base supporting a glass cylinder and having the electric current passing from the top to the bottom of the vessel; but I do not limit myself to the construction and arrangement shown and described, as the same could be arranged in various different ways; but What I do claim, and desire to secure by Letters Patent, is—

1. The process of purifying oil that has been used for lubricating dynamos or electrical machines and containing magnetized metallic particles, consisting in passing the said oil in small drops through a body of water or other fluid, through which an electric current passes, substantially as set forth.

2. In an apparatus for purifying oil, the combination, with the main purifying-chamber, of an outlet-pipe, an overflow-pipe, and a pipe having a series of teats for admitting oil, a plate having arms and a cone-shaped plate supported upon blocks, a battery or dynamo, and wires connecting same to said plates for causing an electric current to pass through water or other fluid contained in the main purifying-chamber, substantially as and for the purposes set forth.

In testimony whereof I have signed my name to this specification, in the presence of two subscribing witnesses, on this 4th day of April, A. D. 1891.

JAMES J. LOWDEN.

Witnesses:
  CHAS. STEERE,
  EDWIN PLANTA.